United States Patent [19]

Sano

[11] Patent Number: 5,943,762
[45] Date of Patent: Aug. 31, 1999

[54] METHOD AND MANUFACTURING A HYBRID TYPE MAGNETIC HEAD SLIDER USING A THIN FILM COIL

[75] Inventor: Akinobu Sano, Skizuoka-ken, Japan

[73] Assignee: Minebea Co., Ltd, Nagano, Japan

[21] Appl. No.: 08/951,461

[22] Filed: Oct. 16, 1997

[30] Foreign Application Priority Data

Nov. 18, 1996 [JP] Japan ..................................... 8-306381

[51] Int. Cl.⁶ ......................................................... G11B 5/42
[52] U.S. Cl. ..................... 29/603.12; 29/603.16; 29/603.21
[58] Field of Search .............................. 29/603.12, 603.2, 29/603.21, 603.22, 603.25, 603.26

*Primary Examiner*—Carl E. Hall
*Assistant Examiner*—Davide Caputo
*Attorney, Agent, or Firm*—Staas & Halsey

[57] ABSTRACT

A method of manufacturing a hybrid type magnetic head slider using a thin film coil in which a number of cores can be manufactured in the sane condition, and improvement and uniformity in yield and performance can be expected. A conductor pattern forming a plurality of thin film coils (2b) and a magnetic material (magnetic cores 2a) passing in the thin film coils are formed on a nonmagnetic base (1) by means of spattering or the like, and grooves (15) for bonding a plurality of ferrite made head cores (13) are formed on a different nonmagnetic base (14). The ferrite made head cores, which are bonded by glass thin films with a fixed gap, are bonded after polished into the outer dimension fitted to the grooves. A thin film coil stick (4) having the thin film coils formed thereon and a head core base (16) having the head cores bonded thereto are combined and bonded together to form a magnetic head slider bond bar (20), which is then cut and subjected to a polishing, whereby a magnetic head slider is completed reducing manual work.

3 Claims, 12 Drawing Sheets

METHOD AND MANUFACTURING A HYBRID TYPE MAGNETIC HEAD SLIDER USING A THIN FILM COIL

BACKGROUND OF THE INVENTION

1. Field of the Invention

This invention relates to a method of manufacturing a hybrid type magnetic head slider using thin a film coil which is used in hard disc drives and floppy disc drives used as auxiliary recording devices for a computer.

2. Description of the Prior Art

Figure 8:
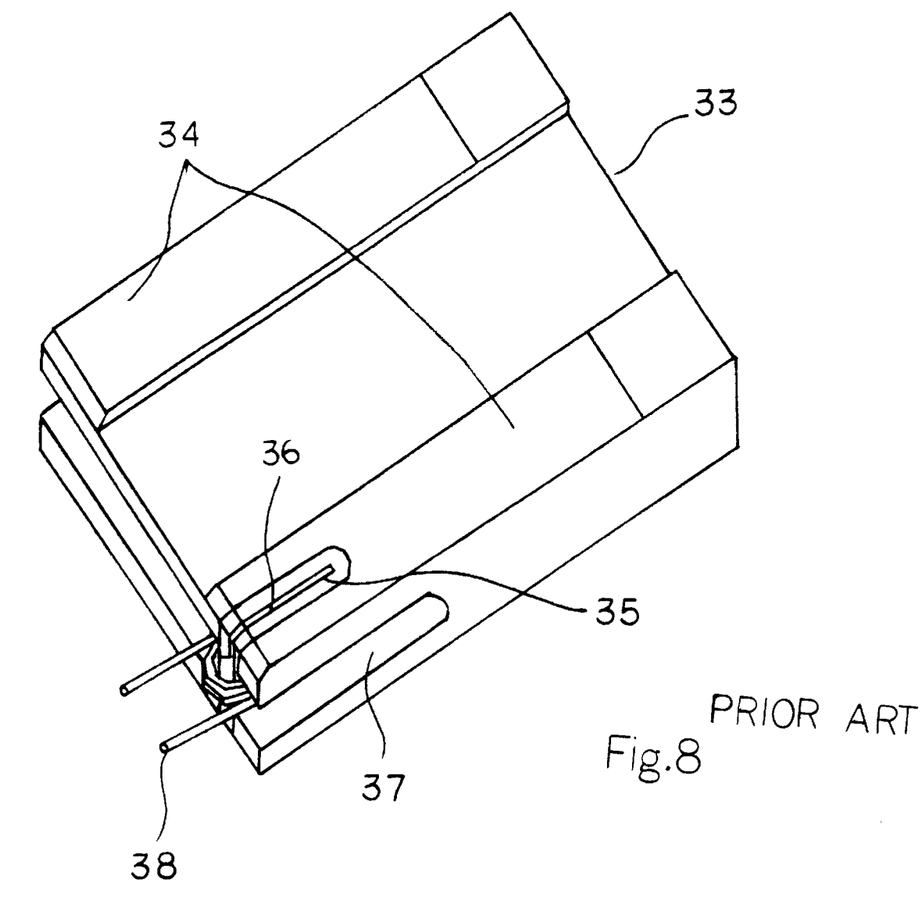
FIG. 8 is a perspective view of a conventional composite type magnetic head slider.

A composite type magnetic lead conventionally used in an auxiliary recording device for a computer has a structure as shown in FIG. 8, wherein an electromagnetic converting coil 38 was wound round either one or both of legs of a core through a winding window 37 disposed on a slider side surface. In accordance with the improvement in recording density per unit surface and volume, the manufacture of a lightweight and small-sized slider has come to be in great demand. However, the dimension of the winding window was also minimized with the downsizing of the slider, and the manual winding as in the past has gotton close to limits of its availability in aspects of yield and productivity. Therefore, it was proposed to reduce the manual winding work by forming the coil portion by the thin film manufacturing technique as employed in the manufacture of a semiconductor, and sticking the coil chip onto the slider side surface, as shown in Japanese Patent Laid-Open Nos. 5-128426, 5-242447, and 7-6316. In FIG. 8, denoted at 33 is a slider, 34 is a rail, 35 is a ferrite core, and 36 is a read-write gap.

However, since a photoresist; used as an insulating film in a coil manufacturing process is deformed or deteriorated when continuously heated at a high temperature, for example, a temperature of 270° C. or more, glass, bonding process of 450°C. or more which was conventionally used in adhesion of cores could not be adopted. When a polymer adhesive such as epoxy resin was used instead of a glass bond, the adhesion interface was likely to be worn or corroded because the slider was exposed to the surface opposed to or slid on a medium, and this had a problem in the reliability of the slider. Further, a conventional manufacturing method comprising adhering cores to the slider side surface while positioning them one by one was limited in aspects of yield and productivity.

SUMMARY OF THE INVENTION

This invention has been attained in order to solve the problems described above, and its object is to provide a method of manufacturing a hybrid type magnetic head slider using a thin film coil in which a number of cores can be manufactured in the same condition, and improvement and uniformity in yield and performance can be expected. To attain this object, this invention provides a method of manufacturing a hybrid type magnetic head slider using a thin film coil which comprises a second process of manufacturing a bar-like thin film coil stick formed on nonmagnetic ceramics having a pair or more of coil magnetic cores and coils for a magnetic head slider and a bar-like nonmagnetic ceramic head core base having a pair or more of ferrite made head cores; a third process of combining and bonding the thin film coil stick and the head core stick together; a fourth process of polishing the rail surface of the resulting bonded slider bond bar, thereby adjusting track width and gap depth; and a fifth process of cutting the slider bond bar, thereby forming individual sliders, and also provides a method of manufacturing a hybrid type magnetic head slider using thin film coils which further comprises, in addition to the above processes, a process of polishing the air inlet end and air outlet end sides of the rail surface of the slider to provide inclinations, or a process of performing a blending work for removing the acute angle portion of the edge portion of the slider rail.

BRIEF DESCRIPTION OF THE DRAWINGS

FIG. 1 (A) to FIG. 1 (D) are process drawings showing a first process of a first embodiment of this invention.

FIG. 2 (E) to FIG. 3 (M) are process drawings showing a second process of the first embodiment of this invention.

FIG. 4 (N) is a process drawing showing a third process of the first embodiment of this invention.

FIG. 4 (O) is a process drawing showing a fourth process of the first embodiment of this invention.

FIG. 5 (P) to FIG. 5 (Q) are process drawings showing a fifth process of the first embodiment of this invention.

FIG. 5 (R) is a process drawing, showing a sixth process of the first embodiment of this invention.

FIG. 5 (S) is a process drawing showing a seventh process of the first embodiment of this invention.

FIG. 6 (A) to FIG. 6 (C) is a schematic view showing a partial process of a second embodiment of this invention.

FIG. 7 (A) to FIG. 7 (C) is a schematic view showing a partial process of a third embodiment of this invention.

DESCRIPTION OF THE PREFERRED EMBODIMENTS

Preferred embodiments of this invention are further described in detail every process in reference to the drawings.

FIG. 1 (A) to FIG. 1 (D) show the first process of a first embodiment of this invention. In FIG. 1 (A), a number of thin film coil elements 2 containing magnetic cores are formed on one surface of a nonmagnetic base 1. In this embodiment, zirconia ($Z_rO_2$) was used as the nonmagnetic base 1, but calcium titanate ($CaTiO_3$), ALTIC (AlTiC), or alumina ($Al_2O_3$) materials may be also used. The dimensions of the base were set to a diameter of 3 inches and a thickness of 0.8 mm. Although the base may have a square form, the unit cost of parts can be reduced by the above dimensions since the number of elements to be taken per unit area increases as the surface area becomes larger.

Figure 1A:
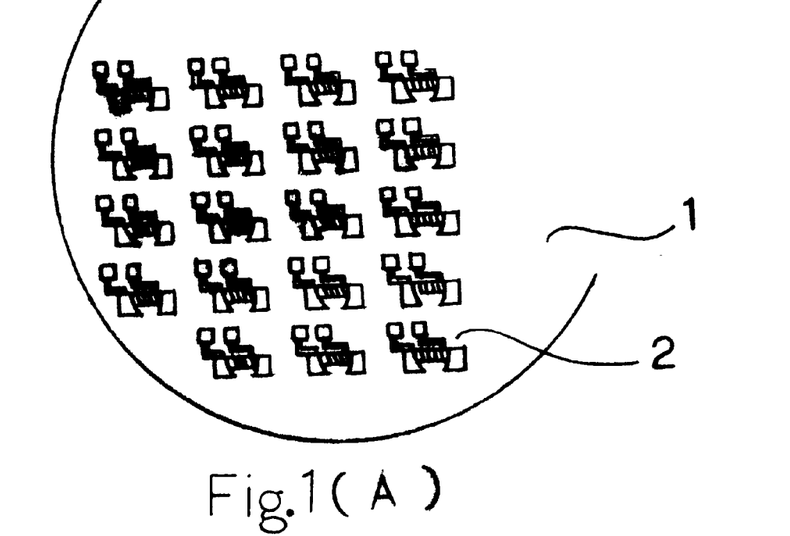
Figure 1B:
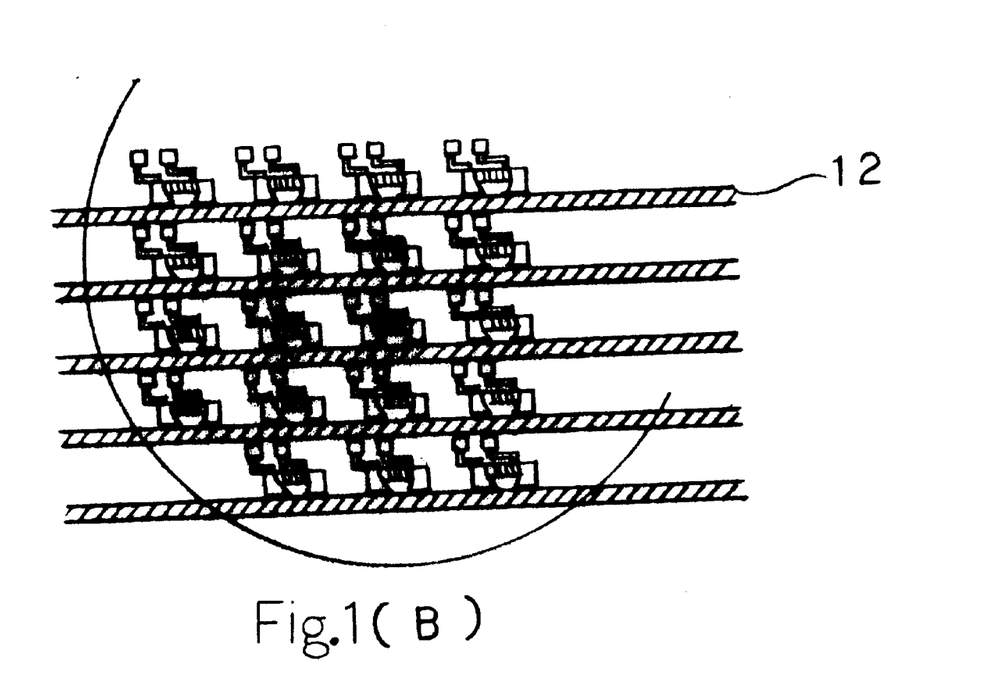
Figure 1C:
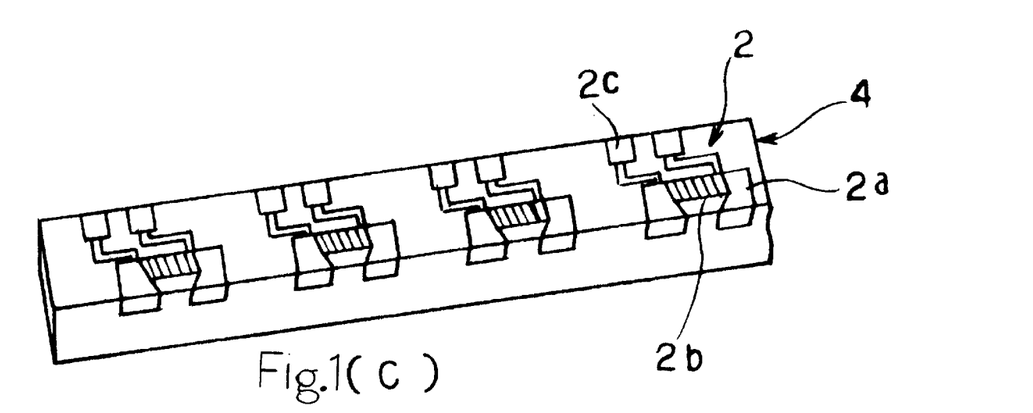
Figure 1D:
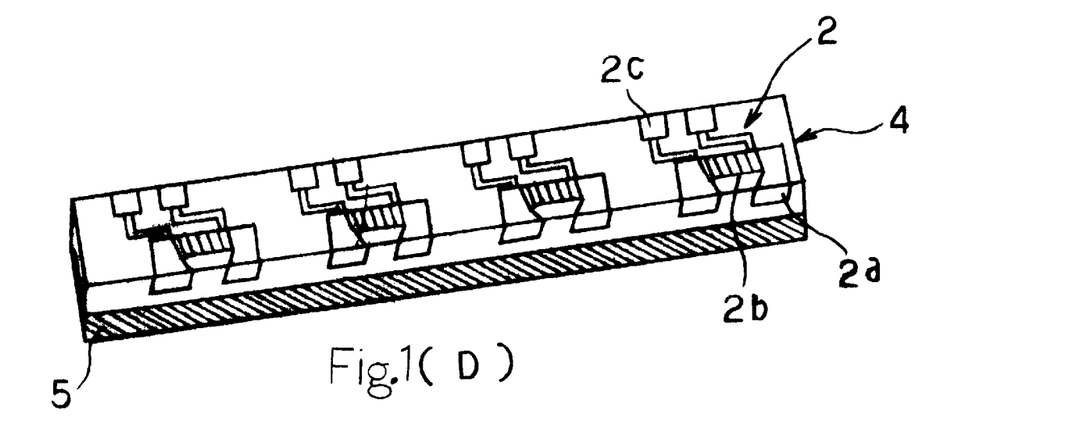
Figure 2E:
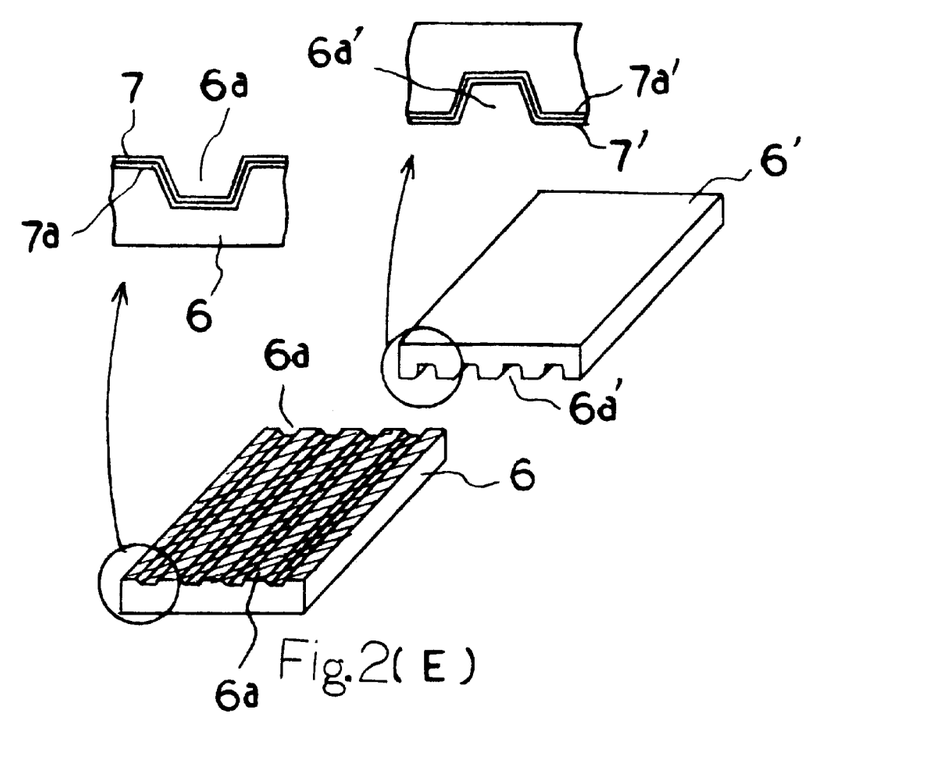
Figure 2F:
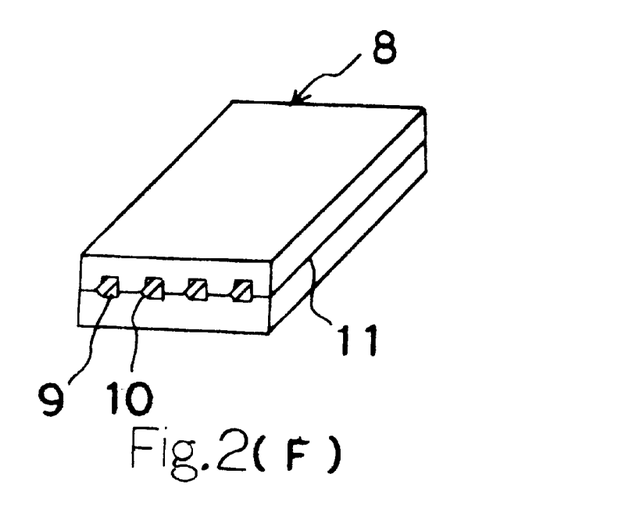
Figure 2G:
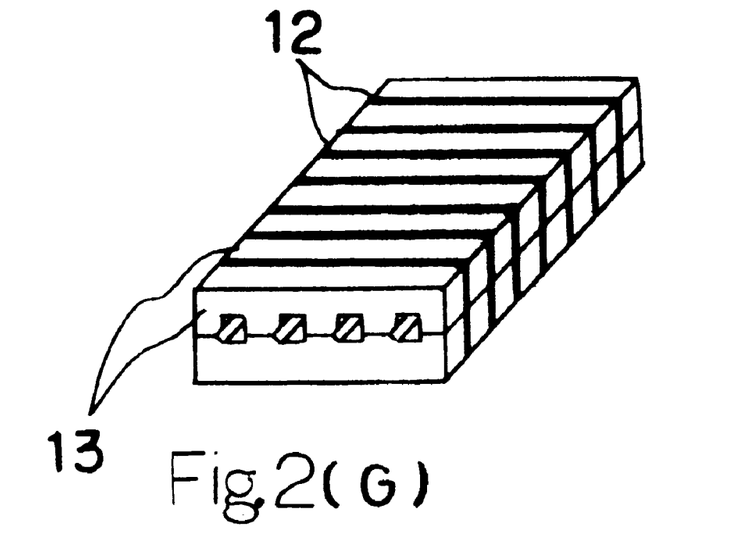
Figure 2H:
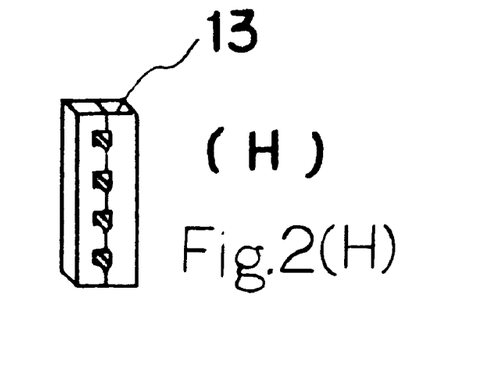
Figure 2I:
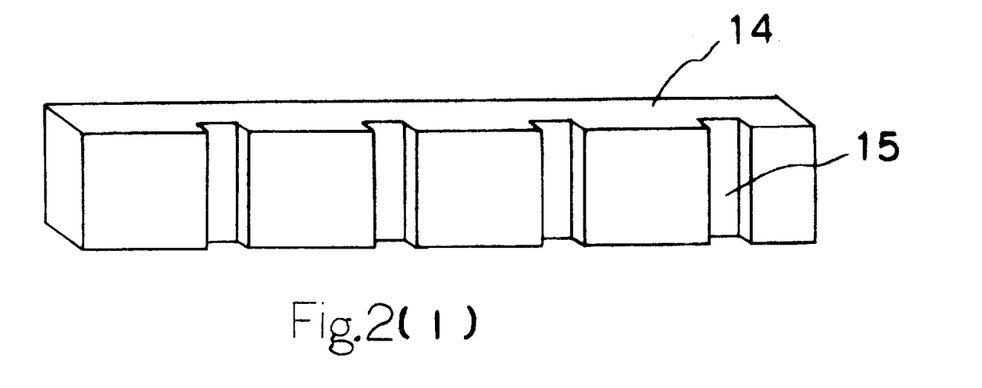
Figure 2J:
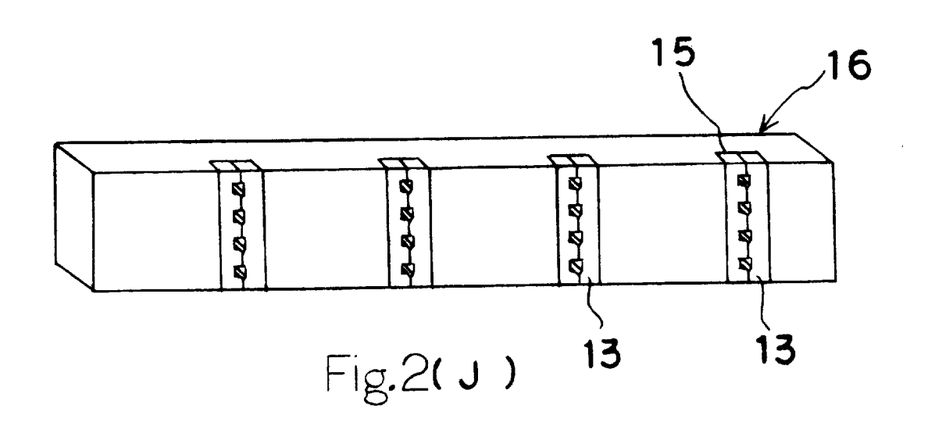

In this connection, about 2500 pieces of pico-size sliders can be taken from the 3-inch-diameter base used in this embodiment. Although the cutting margin is reduced in the following process as the base is thinner, leading to reduction in manhour, the thickness is preferably set to about 0.8 mm–1 mm because the base, when thinned, warps in the formation of elements or in the polishing, leading to reduction in working precision. In FIG. 1 (B) and (C), cutting grooves 12 are formed in the base 1 by a grinder or dicer to form thin film coil sticks 4. In this case, the cutting is performed so as to expose magnetic cores 2a, and the exposed surface is smoothed by polishing as occasion demands. Denoted at 2b is a thin film, coil, and 2c is a terminal. In FIG. 1 (D), a notch 5 is formed by a grinder on the opposite side to the surface having thin film elements of the thin film coil stick 4 formed thereon.

Figure 3K:
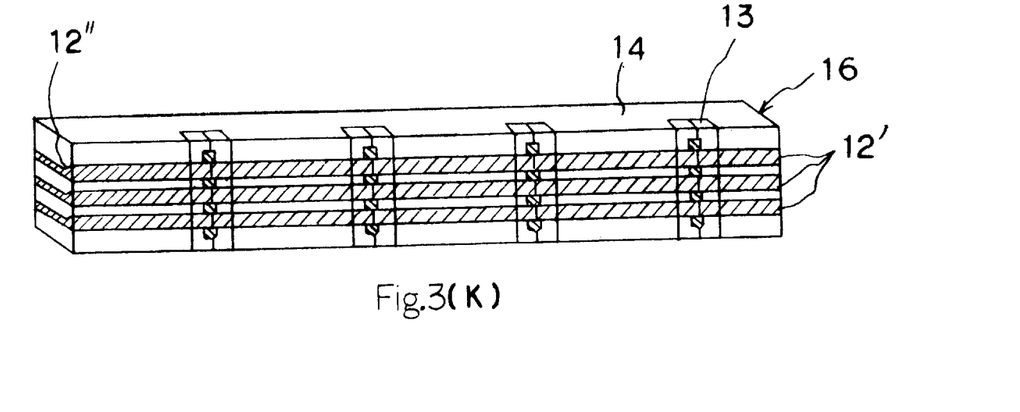
Figure 3L:
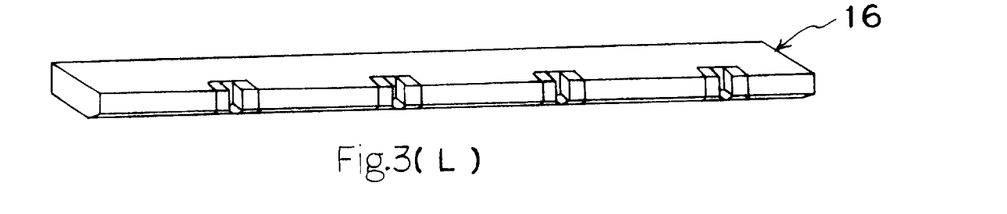
Figure 3M:
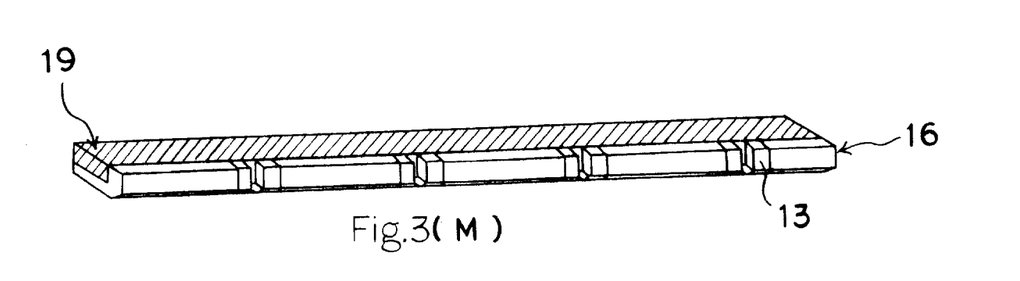

FIG. 2 (E) to FIG. 3 (M) show the second process of the first embodiment. In FIG. 2 (E), thin films 7a and 7a' of iron series having high magnetic permeability are formed by means of spattering on the surfaces of two ferrite made ferrite bases 6 and 6' having grooves 6a and 6'a cut therein, respectively. Further, glass films 7 and 7' forming adhesives for gap formation and glass bonding are formed thereon by the same spattering method. In FIG. 2 (F), the ferrite bases 6 and 6' are put one over another, and then glass-bonded together at about 500–600° C. to form a bond bar 8. Denoted at 9 is a reinforcing glass for filling the grooves 6a, 6'a, and 10 is an apex. Denoted at 11 is a composition plane. In FIG. 2 (G) to (H), the bond bar 8 is cut in the cutting portions 12 by a grinder or dicer to form core sticks 13. In FIG. 2 (I), stick positioning grooves 15 are worked in a separately prepared nonmagnetic base 14, and glass thin films for glass bonding, which are not shown in the drawing, are formed on the worked surfaces by means of spattering. As for such glass thin films, those having a thickness of about 2000–3000 angstroms and a softening point of about 400° C. are selected. The reliability of the glass can be enhanced by increasing the content of silicon oxide in the glass.

In FIG. 2 (J), the core sticks 13 are arranged in the grooves 15 of the nonmagnetic base 14 having the glass thin films formed on the surfaces thereof, and temporarily fixed thereto by an instant adhesive or the like with the positions of the apexes 10 of the sticks being mutually lined up. Thereafter, the glass thin films are fused in an electric furnace, whereby the core sticks 13 are bonded to the nonmagnetic base 14 to form a head core base 16. The core sticks cut from the same bond bar 8 are used herein, whereby a stick in which the apexes 10 of the head cores are horizontally lined up can be formed in a cutting process described later, and the yield can be increased in a process of adjusting the track width and gap depth. In FIG. 3 (K) to (L), cutting portions 12' are cut along the longitudinal direction of the head core base 16. In this case, triangular grooves 12" are preliminarily cut on the apex side of the head cores prior to the cutting, whereby the apex side of the head cores can be tapered with an angle of about 60 , which facilitates the working of track width described later. In FIG. 3 (M), a notched portion 19 is worked by a grinder in the part of the nonmagnetic body having the cores of the head core base 16 adhered thereto. This working is performed so as to expose the side surfaces of the core sticks 13 to the notched portion 19.

Figure 4N:
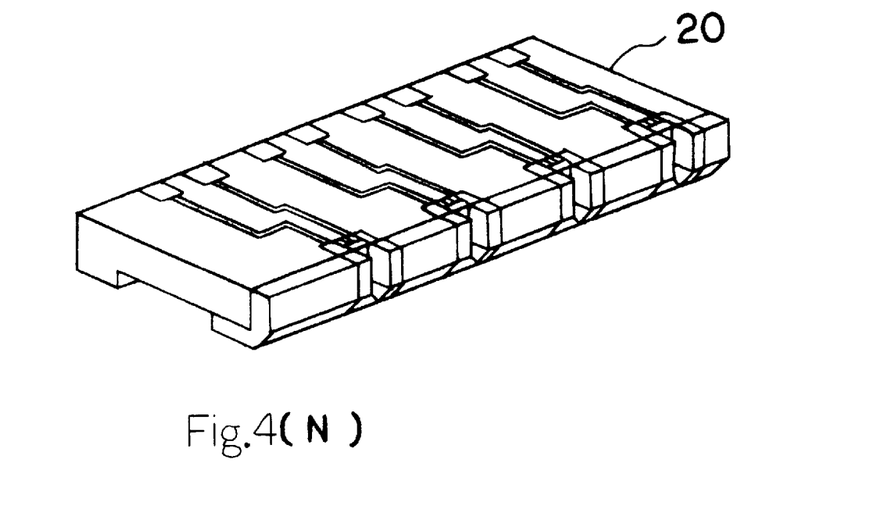

FIG. 4 (N) shows the third process of the first embodiment. The head core base 16 and the thin film coil stick 4 formed in the first process are bonded together by epoxy resin or the like with the surface of a cut notch 5 and the surface of the notched portion 19 shown in FIG. 3 (M) being fitted to each other, whereby a slider bond bar 20 is formed. In order to protect the insulating resist film used in the thin film coil portion, the bonding is performed at a temperature not more than 270°C.

Figure 4O:
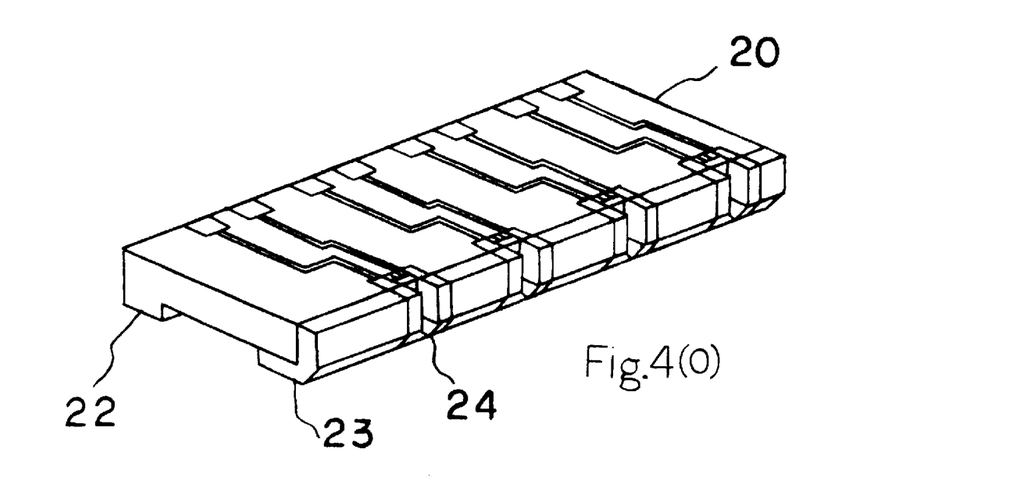
Figure 5P:
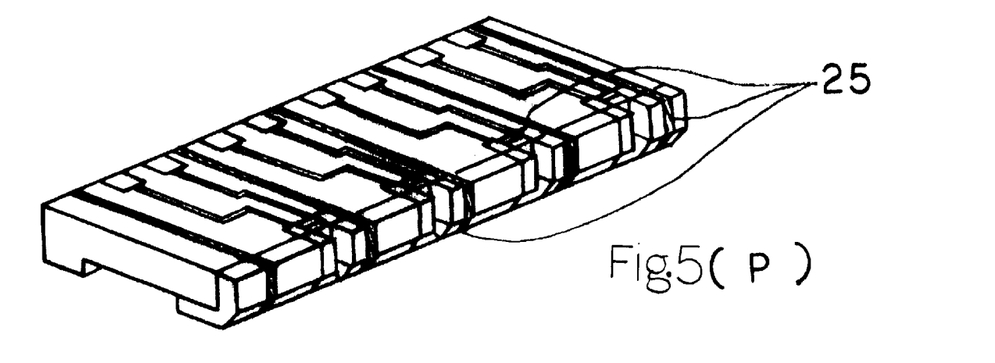
Figure 5Q:
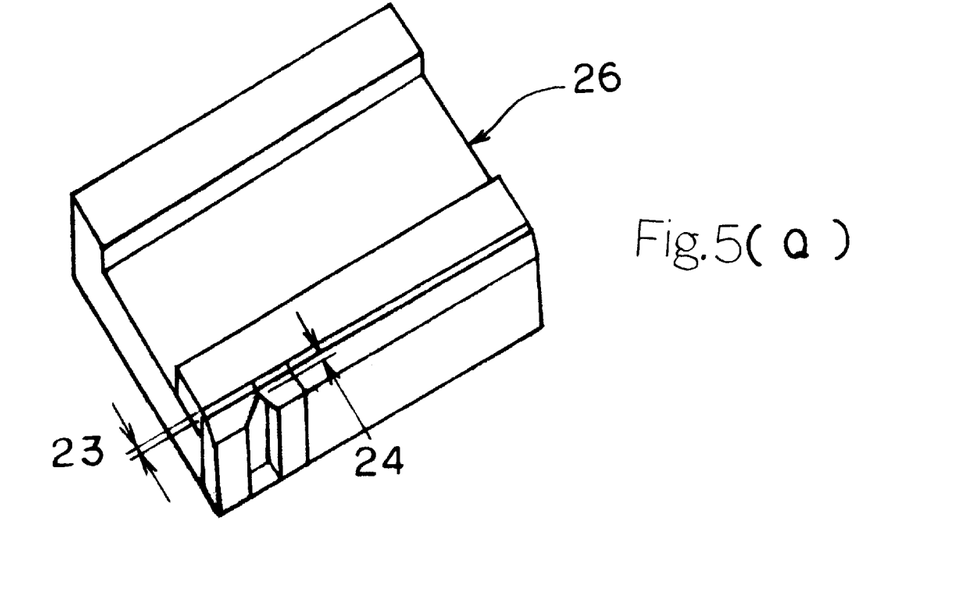
Figure 5R:
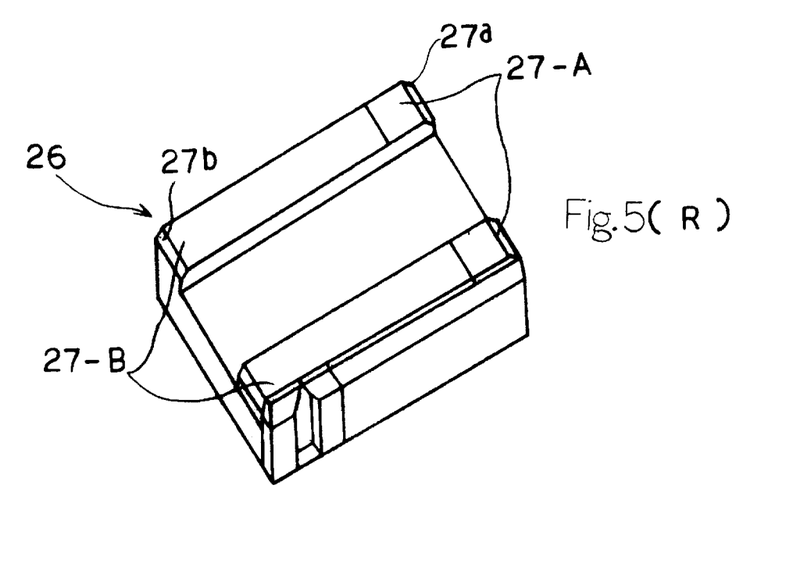
Figure 5S:
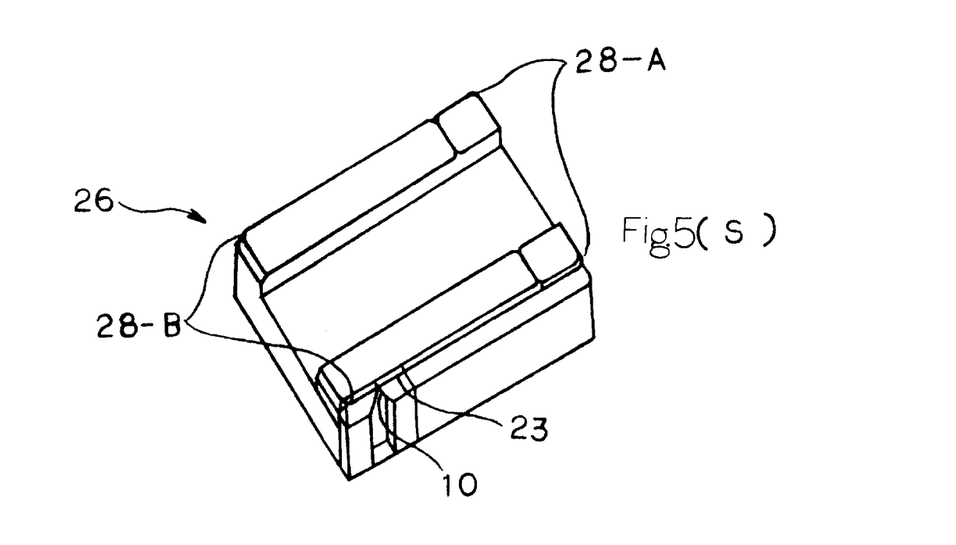

FIG. 4 (O) shows the fourth process of the first embodiment. The height of a rail 22 is uniformed, and the rail surface side of the slider bond bar 20 is polished to adjust track width 23 and gap depth 24.

FIG. 5 (P) to FIG. 5 (Q) show the fifth process of the first embodiment. The slider bond bar 20 is cut in positions of 25 to form individual sliders 26.

FIG. 5 (R) shows the sixth process of the first embodiment. The air inlet side 27-A and air outlet side 27-B of the rail surface 22 are subjected to tapers 27-a, 27-b by lapping.

FIG. 5 (S) shows the seventh process of the first embodiment. The corner portion of the rail surface opposed to a medium of the slider is removed by an abrasive tape, and blended 28A–28B.

Figure 6A:
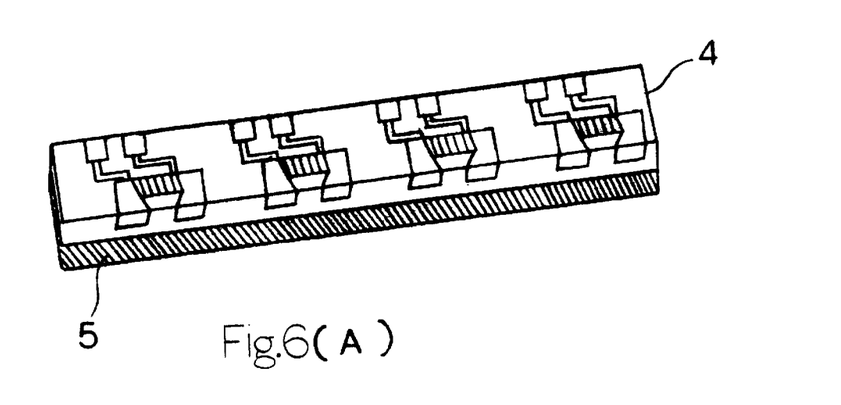
Figure 6B:
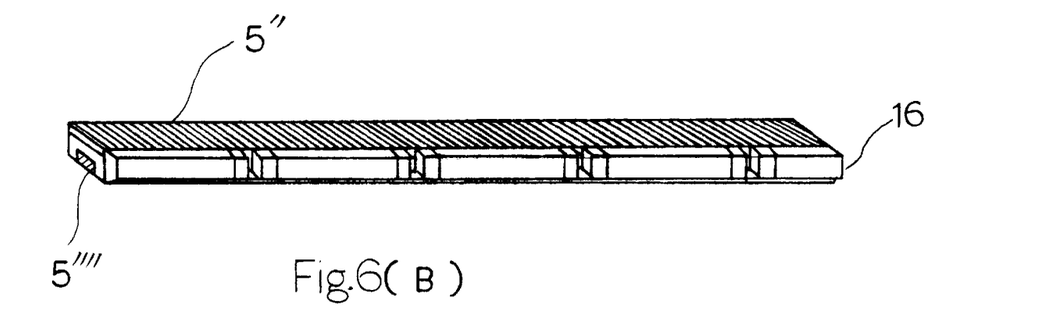
Figure 6C:
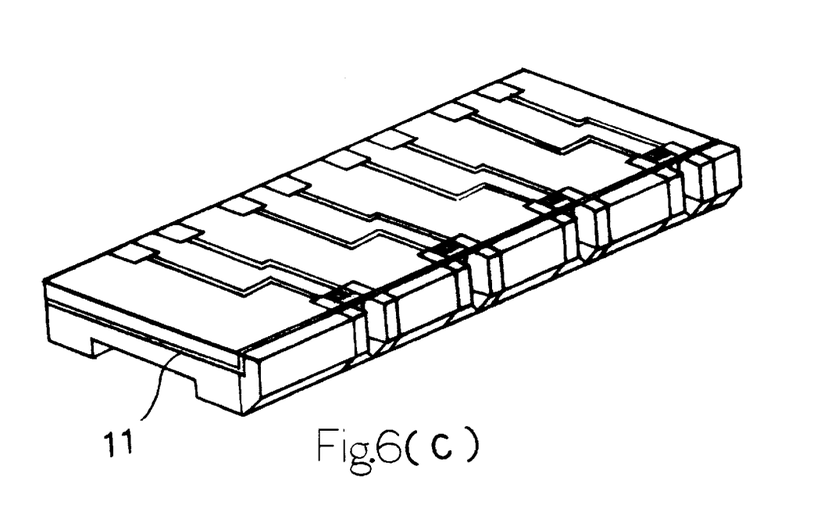

FIGS. 6A–6C show a second embodiment of this invention. In this embodiment, the thin film coil stick 4 having the thin film coil elements formed thereon in the first embodiment is notched in the portion 5, and worked into a thin plate form (FIG. 6 (A)), notched portions 5" and 5"" are formed on the nonmagnetic body portion of the head core base 16 having the ferrite cores bonded thereto (FIG. 6 (B')), and the thin film coil stick 4 and the head core body 16 are mutually adhered in the composition plane 11 at a low temperature by the use of epoxy resin or the like (FIG. 6 (C)). It is cut in the same position as the portions 25 in FIG. 5 (P) to form sliders.

Figure 7A:
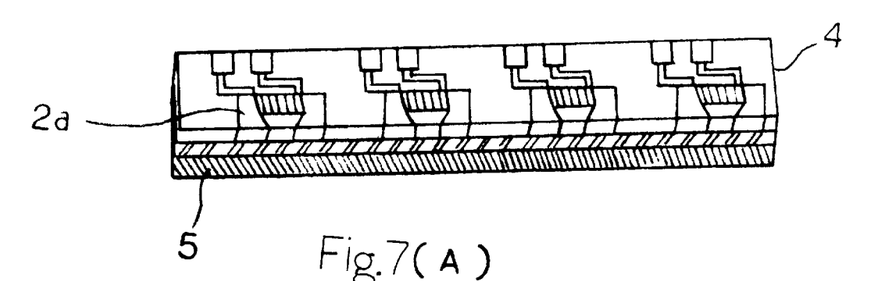
Figure 7B:
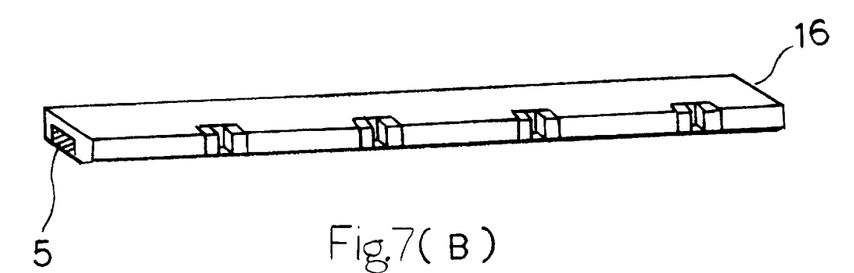
Figure 7C:
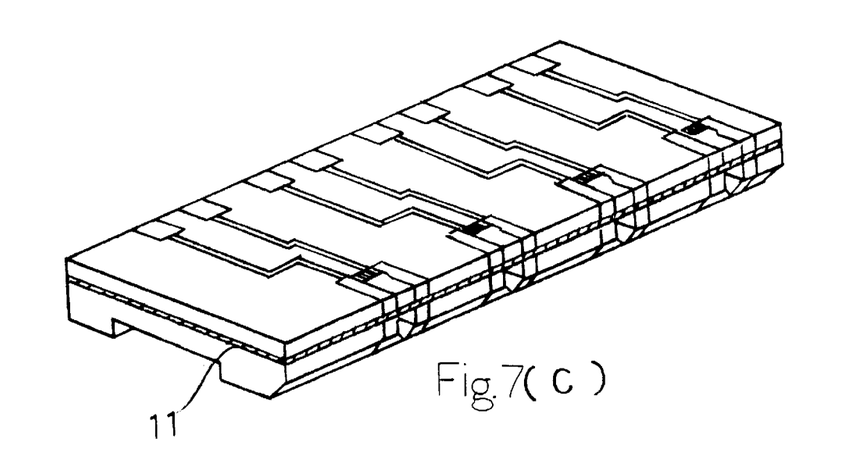

FIG. 7 shows a third embodiment of this invention. In this embodiment, the thin film coil stick 4 having the thin film coil elements formed thereon in the first embodiment is notched in the portion of 5 to expose the magnetic cores 2a to the notched surface (FIG. 7 (A)), the notched portion 5 is formed on the nonmagnetic body portion of the head core base 16 having the ferrite cores bonded thereto, and the thin film coil stick 4 and the head core base 16 are adhered together at a low temperature in the composition plane 11 by the use of epoxy resin or the like as shown in FIG. 7 (C).

According to this invention, since fine ferrite cores which were individually stuck in the past can be stuck to a nonmagnetic base in the form of a stick to prevent the breakage of the cores, improvement in yield can be expected, and further, since a number of sliders can be worked in the same condition, improvement in working precision, reduction in manhour, and uniformity of performance can be also expected. The adhesive layer exposed to the slider surface opposed to a medium consists of only glass, which improves the reliability.

What is claimed is:
1. A method of manufacturing a hybrid magnetic head slider having thin film magnetic cores and coils on the reverse side of its slider surface and having a rail to face a magnetic recording medium, wherein the thin film magnetic cores are magnetically connected to magnetic cores disposed on the slider side surface to form a magnetic circuit, the method comprising the steps of manufacturing a bar shape thin film coil stick formed of nonmagnetic ceramics having a pair or more of the magnetic cores and coils; manufacturing a head core base formed of bar shaped nonmagnetic ceramics having a pair or more of ferrite head cores; of combining and bonding the thin film coil stick and the head core base together; polishing the rail surface of the resulting bonded slider bond bar to adjust track width and gap depth; and cutting the slider bond bar to form individual sliders.

2. A method of manufacturing a hybrid magnetic head slider according to claim 1, further comprising the step that the rail surface of the slider is polished to provide inclinations on an air inlet end side and air outlet end side thereof.

3. A method of manufacturing a hybrid magnetic head slider according to claim 1, further comprising the step that an edge portion of the rail of the slider is polished to remove a corner portion.

* * * * *

UNITED STATES PATENT AND TRADEMARK OFFICE
CERTIFICATE OF CORRECTION

PATENT NO.  :   5,943,762
DATED       :   August 31, 1999
INVENTOR(S) :   Akinobu SANO It is certified that error appears in the above-identified patent and that said Letters Patent is hereby corrected as shown below:

Title Page, Item 54, change "AND" to --OF--;
Title Page, Item 75, delete "[-ken]";
Col. 1, line 1, change "AND" to --OF--;
Col. 1, line 33, delete "[;]";
Col. 1, line 36, delete "[,]" (3rd occurrence);
Col. 2, line 21, delete "[,]";

Col. 4, line 45, insert --:-- after "of";
Col. 4, line 49, delete "[of]" (second occurrence).

Signed and Sealed this

Twenty-eighth Day of March, 2000

Attest:

Q. TODD DICKINSON

*Attesting Officer*    *Commissioner of Patents and Trademarks*